United States Patent [19]
Phillips

[15] 3,650,182
[45] Mar. 21, 1972

[54] CLOSURE FOR FLUID PRESSURE VESSEL

[72] Inventor: John F. Phillips, Hutchinson, Kans.

[73] Assignee: The Cessna Aircraft Company, Wichita, Kans.

[22] Filed: Sept. 17, 1969

[21] Appl. No.: 858,801

[52] U.S. Cl. ............92/128, 220/55 AN, 285/321, 287/52, 292/256.6, 92/164, 92/165, 92/169
[51] Int. Cl. ..........................F01b 29/00, F16j 13/14
[58] Field of Search..............220/55.0; 292/256.6; 287/DIG. 7, 52; 92/128, 165, 164, 169, 171; 285/DIG. 19, DIG. 22, 305, 321

[56] References Cited

UNITED STATES PATENTS

| 2,645,513 | 7/1953 | Sterrett | 285/305 X |
|---|---|---|---|
| 2,890,917 | 6/1959 | Prince | 92/169 UX |
| 3,136,230 | 6/1964 | Buckley | 92/165 RX |
| 3,414,299 | 12/1968 | Roe | 285/321 X |
| 2,468,315 | 4/1949 | Wagner | 285/DIG. 22 |
| 2,642,911 | 6/1953 | Shazor, Jr. | 285/DIG. 22 |
| 3,474,710 | 10/1969 | Stryker | 92/128 |
| 3,218,939 | 11/1965 | Cruse | 92/128 X |
| 3,302,536 | 2/1967 | Fites | 92/63 X |
| 3,347,043 | 10/1967 | Freese | 92/163 X |

FOREIGN PATENTS OR APPLICATIONS

| 154,148 | 6/1952 | Sweden | 285/DIG. 19 |

Primary Examiner—Edgar W. Geoghegan
Assistant Examiner—Allen M. Ostrager
Attorney—Gregory J. Nelson, James W. McFarland and Miller & Brown

[57] ABSTRACT

A mechanical joint for securing the head or bearing end of a linear hydraulic cylinder to the barrel. A fastening member axially secures the end member to the barrel and forms an interference fit therewith to cause slight radial deflection of the barrel or end member, which then acts as a spring to radially load the barrel and end member together. A tapered surface is included on the end member to facilitate assembly and disassembly of the fastening member.

12 Claims, 4 Drawing Figures

PATENTED MAR 21 1972　　　　　　　　　　　3,650,182

INVENTOR.
JOHN F. PHILLIPS
BY
AGENT　　ATTORNEY 3,650,182

1

CLOSURE FOR FLUID PRESSURE VESSEL

BACKGROUND OF THE INVENTION

This invention relates to high pressure vessels having multi-member housings, and to an improved mechanical joint for positively securing the housing members together. More particularly, the invention relates to a mechanical closure joint for vessels such as linear hydraulic cylinders which have cylindrical closure members attached to the cylinder barrel ends to form an interior fluid chamber.

Linear hydraulic cylinders of high operating pressures generally include a cylindrical hollow barrel closed at one end by the head and having a bearing member secured at the other end to form a housing for a fluid working chamber within the barrel. The barrel, head and bearing are all made of dense, heavy material such as steel, cast or ductile iron capable of withstanding high pressures of 2,000 p.s.i. or higher. A rod extends axially through the bearing into the interior work chamber and reciprocates in response to pressure applied within the chamber.

It has been known in such high pressure cylinders to secure either or both the head end and bearing end to the barrel through welding processes. Also, in certain limited instances, it has been possible to form one end integral with the barrel such as through a casting process. Another mechanical joint largely used for the bearing has been threading or screwing the bearing onto the barrel. Such constructions are widely known within the art.

SUMMARY OF THE INVENTION

The present invention proposes an alternative mechanical joint for securing either end member to the barrel of a high pressure linear hydraulic cylinder or similar vessel, that utilizes slight deflection of one of the strong housing members to positively secure the end member to the barrel. fastener.

A fastener member such as a snap ring located in an annular groove on the barrel interior wall, extends beyond the barrel wall to engage the end closure member at a mating groove thereon. This holds the closure member from axial movement relative to the barrel. The fastener member is sufficiently large so as to form an interference fit with the closure member and the barrel when so assembled, causing a slight radial flexing or deflection of the barrel or closure member. Then acting as a high gradient spring the deflected member mechanically loads the barrel and closure member together through the fastening member to virtually lock the fastener into place in the grooves on the barrel and closure member.

The fastener is so arranged that the large hydraulic force of pressure on the closure member attempting to push it axially away from the barrel must act to shear the fastener to separate the closure member from the barrel, thereby providing an extremely strong joint limited only by the shear strength of the fastener.

A tapered diameter ramp portion on the closure member extending up to its assembling groove facilitates assembly and disassembly from the barrel. This provides a simple method of assembly whereby pressurizing the cylinder work chamber forces the closure member onto the fastener until it snaps into place in the closure member assembly groove.

Further objects and advantages of the present invention are set forth in the following detailed description and accompanying drawings of the preferred embodiments.

DETAILED DESCRIPTION OF THE PREFERRED EMBODIMENTS

Figure 1:
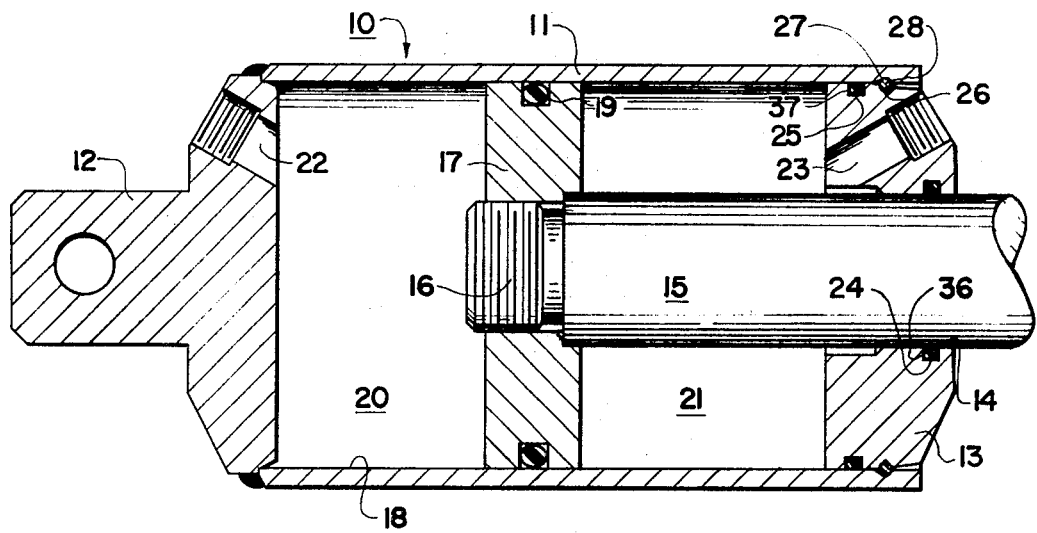
FIG. 1 is a longitudinal section of a hydraulic cylinder embodying the present invention for securing the bearing to the barrel.

More particularly, FIG. 1 illustrates a double-acting linear cylinder 10 having a housing formed by barrel 11, head 12 and bearing 13. Axially reciprocal through bore 14 of bearing 13 is rod 15 extending outside the cylinder to perform useful work. Attached to the inner end of rod 15 at threads 16 is a piston 17 sealingly engaging the wall of the central barrel bore 18. Piston 17 carries a fluid seal 19 to separate bore 18 into two variable volume fluid chambers 20 and 21.

Fluid ports 22 and 23 in the head and bearing ends are provided to connect chambers 20 and 21 with sources of high and low pressure fluid to actuate rod 15. Delivery of pressure fluid to port 22 and chamber 20 and venting chamber 21 through port 23 to low pressure forces rod 15 outwardly, while pressurizing chamber 21 and relieving pressure in chamber 20 causes rod 15 to retract into bore 18.

Figure 2:
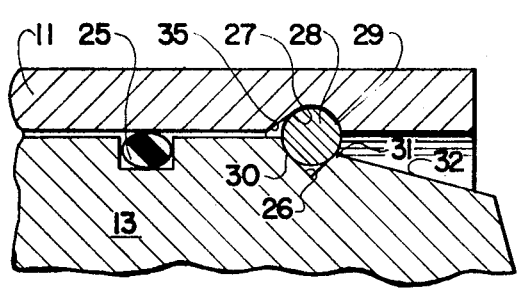
FIG. 2 is an enlarged detail view of the improved mechanical joint of FIG. 1.

Head 12 is welded to barrel 11 in a conventional manner while bearing 13 is connected to the barrel by the improved mechanical joint of the present invention. Bearing 13 is generally cylindrical with a central bore 14 to accommodate and provide a bearing surface for piston rod 15. Annular grooves 36 and 37, on the interior and exterior diameter, respectively, are provided to accept O-ring seals 24 and 25 that prevent fluid leakage from chamber 21 across the bearing. As clearly illustrated in FIG. 2, bearing 13 has a peripheral groove or recess 26 on its outer surface which is located axially adjacent a groove or recess 27 in barrel 11 in the assembled position.

Located within recesses 26 and 27 is a common snap ring fastener 28. Snap ring 28 contacts barrel 11 over an extensive area 29 of the circular portion of groove 27, and contacts bearing 13 at a fairly broad circular area 30 and at corner 31 of groove 26. Rightward axial thrust on bearing 13, from pressure within chamber 21 for instance, is transmitted across snap ring 28 at the larger areas of contact 30 and 29 to be absorbed by barrel 11. Thus, the full shear strength of snap ring 28 opposes rightward or outward movement of the bearing relative to the barrel.

In certain instances, a net leftward force may be exerted on bearing 13 tending to pull it inwardly into bore 18. For instance, friction between rod 15 and bearing 13 tends to pull bearing 13 leftwardly when the rod is retracting and essentially zero or vacuum pressure exists in chamber 21. The net leftward force is small, however, compared to the rightward force on the bearing, and is easily transmitted across corner 31 to snap ring 28 and barrel 11.

The invention includes provisions for positively holding snap ring 28 in assembled position and for completely avoiding chuckle, slight axial movements of the bearing relative to the barrel, prevalent in prior art mechanical joints. To this end snap ring 28 has sufficiently great diameter to form an interference fit with the outer surface of bearing 13. When assembled into grooves 26 and 27, snap ring 28 therefore induces a slight radial expansion of the thin walled barrel 11 at its end region where groove 27 is located. In the assembled position shown in FIG. 2, snap ring 28 still makes an interference fit so that the end of barrel 11 is slightly expanded.

Barrel 11 is not deflected or expanded to its yield point where permanent deformation would occur, but rather deflected slightly to retain a high gradient spring characteristic tending to urge the barrel back to its relaxed position. Therefore, the inherent springback capability of barrel 11 positively biases the barrel and bearing together at snap ring 28. The snap ring is accordingly locked into grooves 26 and 27 to prevent relative lateral movement between the bearing and barrel. Seal 25 is sized to remain capable of sealing leakage flow between the outer surface of bearing 13 and barrel bore 18 when the barrel is in the deflected assembled position.

To further facilitate assembly, which will be discussed in detail hereafter, a reduced and tapered diameter 32 outer surface is included on bearing 13 which extends axially from notch 26 to the end of the bearing. Accordingly, notch 26 is formed having inclined walls of unequal length, the shorter wall facilitating cylinder assembly and the longer wall providing a large area 30 for transmitting the large hydraulic separating force as a shearing force across snap ring 28 to barrel 11.

As discussed, for convenience of assembly recess 27 is formed as a generally circular groove, while recess 26 is formed as a V-notch to minimize chuckle. Although these forms are preferable, it will be obvious that the particular cross-sectional shapes of recesses 27 and 28 can be varied. The chamfer 35 from recess 27 leftward to the bore 18 of the cylinder barrel is provided only to facilitate installation of fluid seal 25.

The assembly of cylinder 10 in FIG. 1 begins with insertion of the assembled rod 15 and piston 17 into the interior of barrel 11 to which head 12 has been welded. Bearing 13, complete with seals 24 and 25, is slipped over rod 15 and pushed far within bore 18 to the left of barrel groove 27. Snap ring 28 is inserted into barrel receiving groove 27 from the open barrel end. Bearing 13 is then forced back rightwardly; snap ring 28 slides up taper 32 as the bearing moves, deflecting barrel 11 radially. The bearing continues to be forced outwardly until corner 31 passes the snap ring center and the snap ring 28 drops into groove 26 forming a radial interference fit with the bearing and barrel in this assembled position.

A convenient method for forcing the bearing onto the snap ring is to introduce high pressure fluid into the cylinder interior. For instance, after placing snap ring 28 in barrel groove 27, pressure fluid is introduced through port 22 into chamber 20. Piston 17 is hydraulically urged rightwardly into contact with bearing 13, whereupon pressure in chamber 20 urges the bearing ramp surface 32 over snap ring 28 until the snap ring drops into groove 26. Of course, the bearing may be forced onto the snap ring by conventional mechanical methods if desired.

The steps are reversed for disassembly, with bearing 13 first being forced back into the barrel interior to allow snap ring 28 to be easily reached and removed from barrel groove 27. Bearing 13 and the piston and rod then readily slip out of the barrel interior. Because of the limited flexure of the barrel, this cylinder construction has been found capable of repeated assembly and disassembly without impairing cylinder performance.

Figure 3:
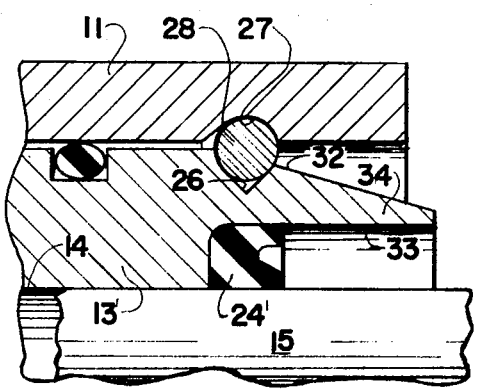
FIG. 3 is a view similar to FIG. 2 showing an alternate construction of the invention.

FIG. 3 illustrates another embodiment of the invention wherein the bearing is designed to deform instead of, or along with, the expansion of the barrel. The bearing 13' has an interior counterbore 33 at its outside end. Counterbore 33 is relatively deep, for instance extending axially inward past groove 26, to form a weakened cylindrical end portion 34 capable of deflecting inwardly. The snap ring 28 is again large enough to form an interference fit so that after assembly the deflected portion 34 of bearing 13' acts as a high gradient spring biased radially toward snap ring 28 and barrel 11. The portion 34 may be designed to provide all the radial spring action in conjunction with a nondeflecting barrel 11, or may assist the spring action of the barrel wherein both the barrel and bearing members would deflect away from each other upon assembly, thus cooperating as springs to hold snap ring 28 in place.

Counterbore 33 may additionally form the receiving groove for the shaft seal 24' that prevents leakage through bearing shaft bore 14. If desired, however, a separate receiving groove (such as groove 36 in FIG. 1) may be incorporated in bearing 13' in addition to counterbore 33.

Figure 4:
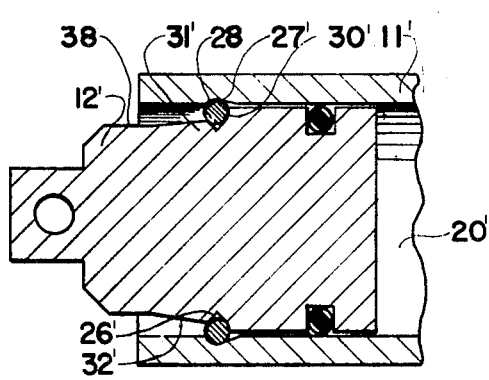
FIG. 4 is a partial longitudinal section of a hydraulic cylinder utilizing the improvements of the present invention to secure the head to the barrel.

The present invention is equally adaptable as a method of securing the cylinder head end closure member onto the barrel. Such arrangement is shown in FIG. 4. Head 12' is designed with the snap ring receiving groove 26' with large area portion 30', corner 31' and tapered diameter 32' as described with respect to the previous illustrations. Snap ring 28 again forms an interference fit between the barrel and end closure member whereby the barrel and head are radially biased toward each other through snap ring 28. Head 12' is assembled onto snap ring 28 in the same manner as described with respect to the bearing 13 of FIG. 1, with snap ring 28 first being placed in barrel groove 27' after which head 12' is forced outwardly and leftwardly into position. Introduction of fluid pressure into chamber 20' can be used to assemble head 12' onto the snap ring. Note that taper 32' extends only a portion of the way toward the outer end of head 12', but is of sufficient length so that the remaining reduced diameter section 38 does not radially interfere with snap ring 28 during assembly.

The cylinders particularly described have closure members which fit within the barrel interior and, accordingly, the mechanical joint is positioned between the barrel interior wall and the closure member exterior surface. The invention is equally adapted for cylinders having a larger diameter end closure member arranged to mate with the barrel exterior surface. In this instance the barrel fits within an interior bore of the closure member, and the improved mechanical joint is located between the barrel exterior and the closure member interior wall.

It can, therefore, be seen that the present invention provides a simple, novel mechanical joint for fastening the head or bearing closure members, or both, onto the cylinder barrel. The embodiments herein specifically described are to be considered exemplary in nature and not as limiting to the scope and spirit of the invention as defined by the following claims.

Having fully described my invention with sufficient clarity so that those skilled in the art may construct and use it, I claim:

1. A mechanical closure for a pressure vessel having an open ended cylindrical housing comprising:
   a first annular groove in the housing adjacent the open end;
   a closure member having a cylindrical portion closely mating and secured to the housing at the open end to close same and define a fluid chamber therein, said closure member having a second annular groove located to axially align with said first annular groove when said closure member is in an assembled position on said housing and at least one of said groove carrying members constructed and arranged to be deflectable in the zone in which it carries the groove; and
   rigid fastening means received in said first and second grooves, said fastening means having sufficient radial width to radially deflect said deflectable member and to maintain said deflection in the assembled position without permanently deforming said deflected member, whereby the deflected member tends to return to its nondeflected position and radially biases the housing and closure members together and locks said fastening means in said grooves to secure the housing and closure members against relative movement in both axial directions.

2. The mechanical closure of claim 1 further comprising a tapered surface portion on the closure member extending axially from said second groove toward one end of the closure member and tapering radially away from the housing to facilitate assembly of the fastening means over said taper portion into said recess from said one closure member end.

3. A mechanical closure for a linear hydraulic actuator including a cylindrical barrel member having an open end comprising:
   a first annular groove in the barrel member adjacent the open end;
   a closure member closely mating and secured to the barrel at said open end to close same and define a fluid chamber within the barrel, said closure member having a second annular groove located to axially align with said first groove when said closure member is in an assembled position on the barrel at least one of said groove carrying members being constructed and arranged to be deflectable in the zone in which it carries its groove; and
   rigid fastening means received in said first and second grooves to axially secure the barrel and closure members against relative axial movement in opposite directions, said fastening means having sufficient radial width to induce radial deflection of said deflectable member and to maintain said deflection in the assembled position without permanently deforming said deflected member, whereby the deflected member tends to return to its non-deflected position and radially biases the barrel and closure members together and locks said fastening means in said grooves.

4. The mechanical closure of claim 3 further comprising a tapered surface portion on the closure member extending axially from said second groove toward one end of the closure member and tapering radially away from the barrel to facilitate assembly of the fastening means over said taper portion into said recess from said one closure member end.

5. The mechanical closure of claim 4 wherein said first groove is located on the interior wall of a central bore of said barrel member and said closure member extends inside said barrel bore at said open end to close same, said second groove located on the closure member exterior surface mating with said barrel interior wall.

6. The mechanical joint of claim 5 wherein said fastening means comprise a snap ring of circular cross section; said first groove is generally semicircular conforming to said snap ring, and said second groove is a V-shaped notch having inclined walls of unequal length with the shorter of said walls intersecting said tapered surface portion to form a shoulder engaging said snap ring to axially secure the barrel and closure members.

7. A hydraulic linear cylinder comprising:
- a cylindrical barrel member having an internal bore and an open end;
- a closure member adapted to be received within said open end and secured to the barrel to close the open end and define a fluid chamber within the cylinder;
- a plunger in said chamber reciprocal through said closure member in response to hydraulic pressure in said chamber;
- a first annular recess on the barrel member internal wall adjacent said open end;
- a second annular recess on an exterior surface of the closure member closely mating with said barrel internal wall, said second recess aligned with said first recess when said closure member is in an assembled position; at least one of said groove carrying members being constructed and arranged to be deflectable under radial load in the zone in which it carries the groove;
- rigid fastening means insertably positioned within said first and second recesses to axially secure the barrel and closure members against relative axial movement in opposite directions, said fastening means forming an interference fit with said barrel and closure members in the assembled position to radially deflect said deflectable member and to maintain said deflection in the assembled position without permanently deforming said deflected member, whereby the deflected member tends to return to its non-deflected position to radially bias the barrel and closure members together in the assembled position and lock the fastening means in said recesses; and
- said closure member exterior surface having a taper portion extending from said second recess toward one end of said closure member tapering radially away from the barrel to facilitate insertion of the fastening means in the cylinder.

8. The linear cylinder of claim 7 wherein said second recess is a continuous V-shaped notch having inclined walls of unequal length, the shorter of said walls intersecting said tapered surface portion to form a shoulder engaging said closure member for axially securing the barrel and closure members.

9. The linear actuator of claim 7 wherein said closure member is a cylinder head partially inserted within the interior of said barrel member.

10. The linear actuator of claim 7 wherein said closure member is an end bearing having a central through bore adapted to support the reciprocation of said plunger.

11. The mechanical joint of claim 10 wherein said bearing is counterbored at said one end forming a weakened thin walled annular portion of the bearing at said one end capable of deflecting radially when said closure member is inserted in said recesses.

12. The device of claim 11 wherein said counterbore extends axially inward past said second recess.

\* \* \* \* \*